United States Patent
Mu et al.

(10) Patent No.: US 8,042,185 B1
(45) Date of Patent: Oct. 18, 2011

(54) ANTI-VIRUS BLADE

(75) Inventors: Paul Yuedong Mu, San Jose, CA (US);
John Z. Zhuge, San Jose, CA (US);
Nam Mong Le, Los Gatos, CA (US)

(73) Assignee: NetApp, Inc., Sunnyvale, CA (US)

( * ) Notice: Subject to any disclaimer, the term of this patent is extended or adjusted under 35 U.S.C. 154(b) by 823 days.

(21) Appl. No.: 11/862,922

(22) Filed: Sep. 27, 2007

(51) Int. Cl.
*G06F 12/14* (2006.01)
*H04L 29/06* (2006.01)

(52) U.S. Cl. .......................................... 726/24; 713/151

(58) Field of Classification Search .................... 726/24; 713/151
See application file for complete search history.

(56) References Cited

U.S. PATENT DOCUMENTS

| 6,173,291 | B1 | 1/2001 | Jenevein |
| 6,442,651 | B2 | 8/2002 | Crow et al. |
| 6,718,469 | B2 * | 4/2004 | Pak et al. ........................ 726/24 |
| 6,735,700 | B1 * | 5/2004 | Flint et al. ........................ 726/24 |
| 6,928,555 | B1 * | 8/2005 | Drew .............................. 726/24 |
| 6,983,296 | B1 | 1/2006 | Muhlestein et al. |
| 7,069,316 | B1 * | 6/2006 | Gryaznov .................... 709/224 |
| 7,237,239 | B1 | 6/2007 | Goel et al. |
| 7,269,620 | B2 | 9/2007 | Bes et al. |
| 7,363,657 | B2 * | 4/2008 | Caccavale ...................... 726/24 |
| 7,565,399 | B1 | 7/2009 | Goel |
| 7,809,868 | B1 | 10/2010 | Mu |
| 2002/0116627 | A1 * | 8/2002 | Tarbotton et al. ............. 713/200 |
| 2003/0028785 | A1 * | 2/2003 | Pak et al. ....................... 713/188 |
| 2003/0115421 | A1 | 6/2003 | McHenry et al. |
| 2003/0135411 | A1 * | 7/2003 | Ushiki et al. |
| 2005/0060686 | A1 * | 3/2005 | Shenfield et al. ............. 717/114 |
| 2005/0108518 | A1 * | 5/2005 | Pandya ......................... 713/151 |
| 2005/0114700 | A1 * | 5/2005 | Barrie et al. .................. 713/201 |
| 2005/0283603 | A1 * | 12/2005 | Raman et al. ................ 713/152 |
| 2006/0080439 | A1 | 4/2006 | Chud et al. |
| 2006/0161988 | A1 * | 7/2006 | Costea et al. .................... 726/25 |
| 2007/0038637 | A1 | 2/2007 | Taneja et al. |
| 2007/0150951 | A1 * | 6/2007 | Aaron et al. ..................... 726/22 |
| 2007/0156966 | A1 | 7/2007 | Sundarrajan et al. |
| 2007/0192863 | A1 * | 8/2007 | Kapoor et al. .................. 726/23 |
| 2007/0220608 | A1 * | 9/2007 | Lahti et al. ...................... 726/24 |
| 2007/0266056 | A1 * | 11/2007 | Stacey et al. .................. 707/203 |
| 2008/0307527 | A1 * | 12/2008 | Kaczmarski et al. ........... 726/24 |

OTHER PUBLICATIONS

Cerpa, A., "RE: ISTag in iCAP draft", 2001, Internet: imc.org, p. 1-2.

(Continued)

*Primary Examiner* — Techane Gergiso
(74) *Attorney, Agent, or Firm* — Cesari and McKenna, LLP

(57) ABSTRACT

An anti-virus blade provides anti-virus services to a storage system and eliminates the need to develop an interface to initiate a scan operation at the blade. An anti-virus engine executed at the blade receives a request to scan data maintained by the storage system. The anti-virus engine creates a stub file (e.g., a file that has the same name as the Currently Amended file indicated in the request, but does not contain data) and issues an I/O command to the file. A file framework module executed at the blade intercepts the I/O to the dummy file and passes the I/O to an anti-virus application, which is registered with the file framework to receive I/Os from the anti-virus engine. The anti-virus application, in turn, initiates a scan operation by issuing a read request to the stub file, without receiving the request for scanning directly from the storage system.

25 Claims, 5 Drawing Sheets

OTHER PUBLICATIONS

Elson, et al., "RFC 3507—Internet Content Adaptation Protocol (ICAP)", Apr. 2003, Internet: www.ietf.org, p. 1-46.

Freed, et al., "Multipurpose Internet Mail Extensions (MIME) Part One: Format of Internet Message Bodies", RFC 2045, Nov. 1996.

"Internet Content Adaptation Protocol ICAP, Network Appliance, Version 1.01", Jul. 30, 2001. Available at http://www.icap-forum.org/documents/specification/icap_whitepaper_v1-01.pdf, retrieved Aug. 7, 2009.

ProxySG with Web Virus Scanning, "High Performance, Real-Time Virus Scanning of Web Content", Blue Coat Systems, Inc., 2005.

Rosenberg, J. "The Extensible Markup Language (XML) Configuration Access Protocol (XCAP)", Request for Comments 4825, May 2007, 67 pages.

Stecher, M., "RE: Question on ISTag in ICAP Protocol", 2003, Internet: imc.org, p. 1-2.

WebWasher, "WebWasher Enterprise Edition (EE)—Setting up NetCache 5.2 with ICAP Version 1.0", 2001, WebWasher, p. 1-34.

* cited by examiner

ANTI-VIRUS BLADE

FIELD OF THE INVENTION

The present invention relates to anti-virus solutions for storage devices, and more particularly, to a manufacturer-neutral anti-virus solution.

BACKGROUND

A storage system is a processing system adapted to store and retrieve data on behalf of one or more client processing systems ("clients") in response to external input/output (I/O) requests received from clients. A storage system can provide clients with a file-level access to data stored in a set of mass storage devices, such as magnetic or optical storage disks, tapes, or non-volatile memory (and thus can be implemented as a network-attached storage (NAS) device). Alternatively, a storage system can provide clients with a block-level access to stored data (and implemented as a Storage Area Network (SAN) device), rather than file-level access, or with both file-level access and block-level access. Data storage space has one or more storage "volumes" comprising of a cluster of physical storage disks, defining an overall logical arrangement of storage space.

Network storage devices provide convenient data access, centralized storage and data management solutions for an enterprise. Because an enterprise's most important assets are often contained in its information, it is essential to maintain data integrity and keep the data virus-free. For example, a single virus-infected file in a storage system can infect large amounts of data, thereby causing disruption to storage services and other difficulties.

Anti-virus solutions have been offered by various vendors to provide security and data integrity for storage systems. One such a solution represents a server that executes an anti-virus application that provides virus scanning, pattern updates, event reporting, and anti-virus configuration. Exemplary servers 190 in communication with a storage system 120 via Remote Procedure Calls (RPC) are shown in FIG. 1. Each server 190 can be a computer system executing Windows® operating system provided by Microsoft Corporation of Redmond, Wash. Server 190 executes an anti-virus application 146, which can be provided by Trend Micro, Inc. of Cupertino, Calif., by Symantec Corporation of Cupertino, Calif., or by any other manufacturer. In order to perform virus checking of the data stored at the storage system 120, an anti-virus application has to be able to receive requests for scanning from the storage system, to obtain data from the storage system to scan, and to provide results of the scanning to the storage system. To this end, manufacturers of anti-virus applications typically have to modify an anti-virus application to enable the application to perform these tasks. For example, a component, such as a scan server 192, can be implemented on the server 190 for purposes of receiving requests for scanning, sending the requests to the anti-virus application, and providing results of the scanning to the storage system. Such a scan server can be ServerProtect® provided by Trend Micro of Cupertino, Calif. Furthermore, manufacturers of anti-virus applications also implement a Common Internet File System (CIFS) client or network file system (NFS) client that would allow an anti-virus application to send requests for data to be scanned to and otherwise communicate with the storage system using the protocol that is understood by the storage system.

Still with reference to FIG. 1, storage system 120 can be a storage system provided by Network Appliance of Sunnyvale, Calif. As shown in FIG. 1, storage system 120 can be registered with multiple servers 190. However, each server is dedicated to a single storage system. When a user of a client system ("client") 110 attempts to access data on the storage system 120 or to store new data, an anti-virus client 122 executed at the storage system 120 issues a request to one of the registered servers 190. Scan server 192 at server 190 receives the request and sends the request for scanning to anti-virus application 146. The anti-virus application 146 initiates a scan operation by issuing a request for data to storage system 120. The anti-virus application 146 uses, for example, a CIFS client or NFS client (not shown in FIG. 1) to translate the request to the protocol that can be understood by the storage system. A protocol layer at the storage system (the protocol layer is not shown in FIG. 1) receives the request, passes the decoded request to a file system or a volume manager (shown in FIG. 2), obtains the data for scanning, and sends the data to the anti-virus application 146. The anti-virus application 146 scans data for viruses and sends the results of the scanning to the scan server 192. The scan server 192, in turn, provides the results of the scanning to the storage system 120. Based on the scan results, client system 110 is either allowed to access data or denied access to the data.

The above-described approach, however, has a number of drawbacks. A chief among them is that it requires each anti-virus manufacturer to develop an interface, such as a scan server, to communicate with the storage system and to issue requests to scan data to an anti-virus application. Developing the interface at the storage system often requires manufacturers of storage systems entering into licensing arrangements with the manufacturers of anti-virus applications, which may be costly. Since only few manufacturers develop scan servers, users of client systems are limited to the number of manufacturers of anti-virus solutions. Moreover, a request for data is processed in a protocol stack of the storage system, thereby slowing down the performance of the storage system.

Accordingly, what is needed is a seamless, easy-to-deploy, and high-performance anti-virus solution for storage systems.

SUMMARY OF THE INVENTION

Embodiments of the present invention provide a system, method, and computer program product that overcomes prior art limitations by eliminating the need to implement a proprietary interface (such as a scan server) that sends a request for scanning from a storage system to an anti-virus application. Instead, a blade that hosts an anti-virus application is provided. An anti-virus engine executed at the blade receives a request to scan a file (e.g., a container, an object, a simulation of a volume, or any other storage entity) maintained by the storage system. The anti-virus engine creates a "dummy" file (or a stub file) (e.g., a file that has the same name as the Currently Amended file indicated in the request, but does not contain data) and issues an input/output (I/O) command to the file. A file framework module executed at the blade intercepts the I/O to the dummy file and passes the I/O to the anti-virus application, which is registered with the file framework module to receive I/Os issued by the anti-virus engine. The anti-virus application, in turn, initiates a scan operation by issuing a read request to the stub file. Importantly, the scan operation is initiated by the anti-virus application without receiving a scan request directly from the storage system. Advantageously, the present invention eliminates the need to require manufacturers of anti-virus applications to develop an interface, such as a scan server, to trigger a scan operation. Since the need for having such an interface is eliminated, users of anti-virus solutions have more flexibility in choosing anti-virus manufacturers.

According to an embodiment of the present invention, the anti-virus application maintains an interceptor module, which registers I/O callbacks with the file framework module on the blade. A callback represents instructions passed to the filter for execution, often to call other procedures or functions. A callback may be stored in a data structure in memory at the anti-virus blade. The file framework module determines which I/O callbacks need to be invoked when an I/O request is intercepted, and invokes the callback. For example, according to an embodiment of the present invention, an interceptor module of the anti-virus application registers for read requests initiated by the anti-virus engine, and thus can intercept the read request to a stub file issued by the anti-virus engine.

The anti-virus blade also executes a virtual file filter, which registers with the file framework at the blade for read requests initiated by the anti-virus application. Thus, the file framework can intercept a read request to the stub file initiated by the anti-virus application. The virtual file filter is responsible for accessing (e.g., by issuing calls for data directly) to the anti-virus filter executed at the storage system. Advantageously, the anti-virus filter sends a request for data to the file system (or to the volume manager) at the storage system (rather than to a protocol stack) and provides data directly to the virtual file filter at the blade. The virtual file filter then sends the data to the anti-virus application for scanning. Thus, rather than requiring the anti-virus application to translate its requests for data to a protocol that can be understood by the storage system, the present invention implements the virtual file filter at the anti-virus blade that can intercept I/O requests to the stub file created by the anti-virus engine and pass the requests directly to the anti-virus filter at the storage system. By circumventing the need to send the requests for data to the protocol stack, the present invention improves performance of the storage system as compared to prior art implementations. Moreover, the present invention offers a seamless solution since the anti-virus blade does not need to be managed separately from the storage system.

Furthermore, the present invention can be implemented both in NAS and SAN environment. Thus, if the storage system is implemented as a SAN device (which provides for block-based access for data), sending a request to scan every block indicated in access requests may result in unnecessary operations. Such operations may slow down performance of the storage system. As a result, according to this embodiment, the anti-virus filter at the storage system may send requests for scanning less frequently (as compared to the NAS implementation). For example, the anti-virus filter may send requests for scanning according to a schedule as to avoid blocks to be scanned unnecessarily. Such a schedule may be stored in a configuration file in a persistent storage (e.g., disks). When a configuration file is loaded in memory, it becomes part of a data structure accessed by the anti-virus filter.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Network and Storage Server Environment

Figure 1:
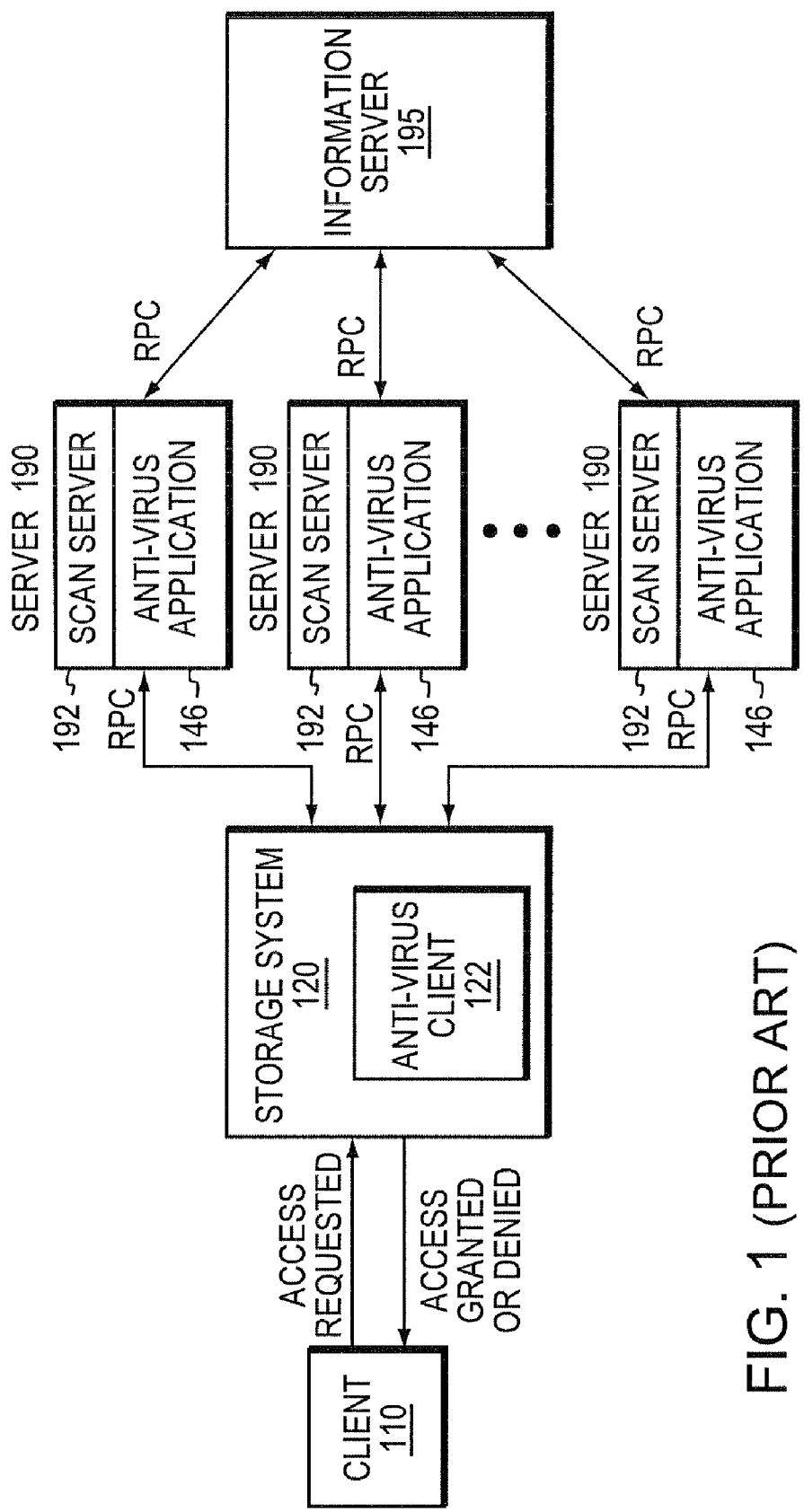
FIG. 1 is a diagram illustrating prior art implementation of a system for providing anti-virus solution to a storage system.
Figure 2:
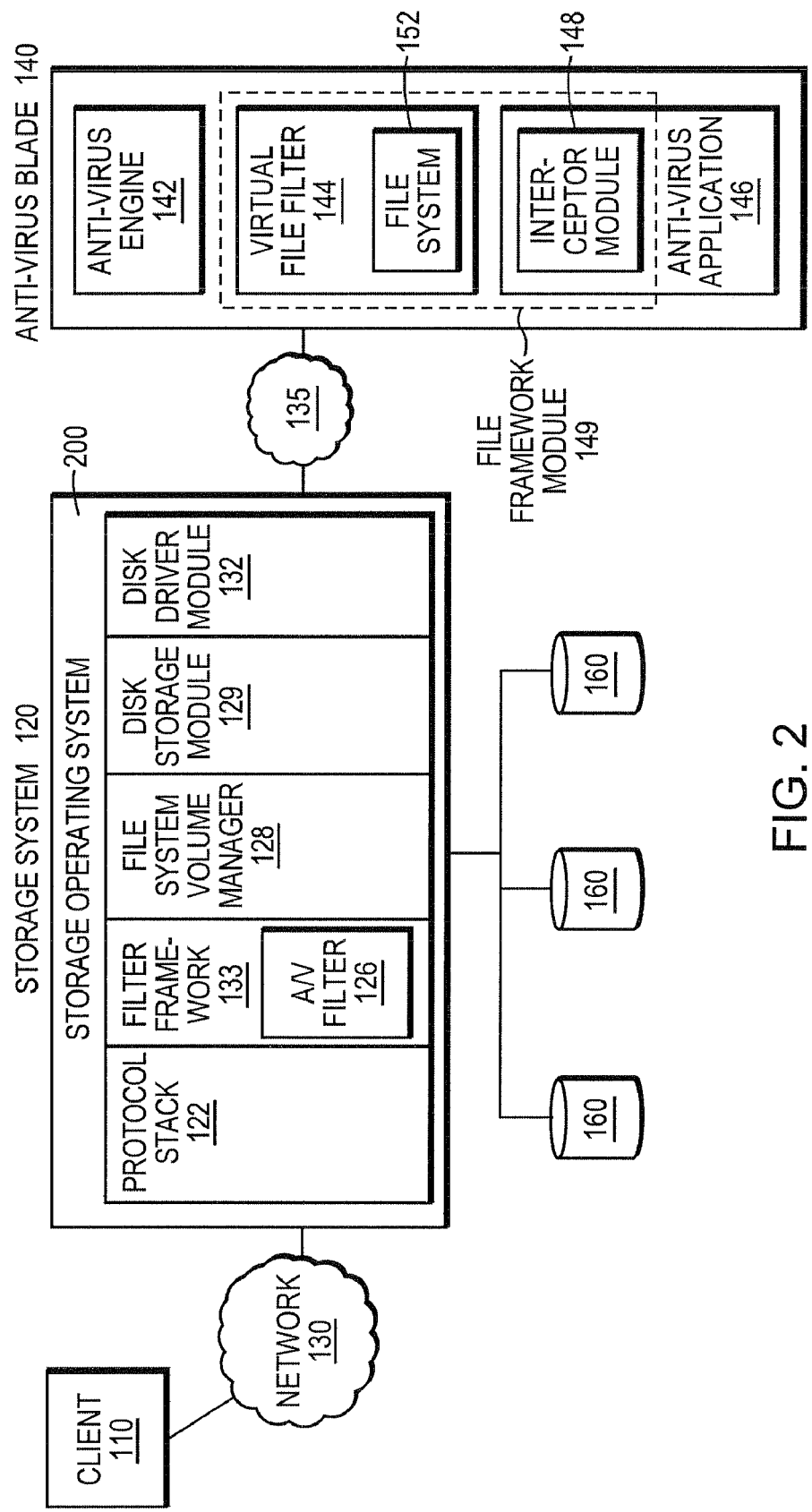
FIG. 2 is a diagram of a system providing anti-virus capabilities to a storage system according to an embodiment of the present invention.

Referring now to FIG. 2, it illustrates environment in which the present invention is implemented. The environment includes a client system 110 ("client") requesting access to data maintained by storage system 120. The environment also includes an anti-virus blade 140 that executes a commercially-available anti-virus application 146, an anti-virus engine 142 communicating with storage system 120, and a virtual file filter 144. The anti-virus application 146 includes an interceptor module 148, which registers I/O callback procedures (referred to herein as "callbacks") with a file framework module 149. A callback represents instructions passed to the filter for execution, often to call other procedures or functions. Virtual file filter 144 also registers I/O callbacks with the file framework module 149. These components are described in greater detail below.

Client 110 communicates with storage system 120 over network 130, which can be a local area network, a wide area network, or the application network. Although one client 110 is shown in FIG. 2, those skilled in the art would understand that any number of clients can communicate with storage system 120 over network 130. The client 110 transmits requests for data to the storage system 120 and receives responses to the requests over network 130. Data transmitted between client 110 and storage system 120 is encapsulated in data packets. If client 110 executes the Windows® operating system, data packets can be transmitted using the Common Internet File System (CIFS) protocol over Transmission Control Protocol/Internet Protocol (TCP/IP). On the other hand, if client 110 runs the UNIX® operating system, it may communicate with the storage system 120 using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that client systems running other types of operating systems may also communicate with the storage system 120 using other file access protocols. Clients 110 may utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as the storage devices 160, to attach to the storage system 120.

Although not shown in FIG. 2, client 110 can execute a client software, which can be CIFS client software, NFS client software, DAFS client software, or any other application. Client 110 further includes a protocol stack (not shown), which may include TCP/IP protocol stack (Internet Protocol layer and its supporting transport mechanisms, the Transport Control Protocol layer and the User Datagram Protocol layer).

Storage system 120 is a device that manages storage of data that can be stored, for example, on storage devices 160. Those skilled in the art would understand that data can be stored on any other media. Storage system 120 also executes storage operating system 200. In the illustrative embodiment, storage operating system 200 can be the Data ONTAP™ operating system available from Network Appliance Inc., of Sunnyvale, Calif. As used herein, the term "storage operating system" generally refers to the computer-executable code operable on a computer that manages data access. The storage operating system 200 can be implemented as an application program operating over a general-purpose operating system, such as UNIX® or Windows NT®, or as a general-purpose operating system with configurable functionality, which is configured for storage applications as described herein.

The storage operating system 200 comprises a series of software layers that are organized as a network protocol stack 122, including a network driver layer (e.g., an Ethernet driver), a network protocol layer (e.g., an Internet Protocol layer and its supporting transport mechanisms, the Transport Control Protocol layer and the User Datagram Protocol layer), as well as a file system protocol server layer (e.g., a CIFS server, a NFS server, etc.). The protocol stack 122 also supports block-based access protocols, such as the Small Computer Systems Interface (SCSI) and Fiber Channel (FC). In addition, the storage operating system 200 includes a disk storage module 129 that implements a disk storage protocol, such as a Redundant Array of Independent (or Inexpensive) Drives (RAID) protocol. In one embodiment, disk storage module 129 can be a software module executed on the storage system 120. In an alternative embodiment, disk storage module 129 can be a separate controller implemented as hardware.

Storage system 120 further includes a disk driver module 132 that implements a disk access protocol such as, e.g., a Small Computer Systems Interface (SCSI) protocol.

Storage system further includes a virtualization system that may be abstracted through the use of a file system 128 or a volume manager. The file system 128 logically organizes the information as a hierarchical structure of named directory and file objects (hereinafter "directories" and "files") on the storage devices 160. Each file stored on storage devices may be implemented as a set of disk blocks configured to store information, such as data, whereas the directory may be implemented as a specially formatted file in which names and links to other files and directories are stored. The file system 128 uses index nodes ("modes") to identify files and file attributes (such as creation time, access permissions, size and block location). The file system 128 can be implemented as a Write Anywhere File Layout (WAFL™) file system, which can also provide volume manager capabilities. Those skilled in the art would understand that any appropriate file system may be enhanced for use in accordance with the inventive principles described herein. The volume manager can be a message-based system that provides logical volume management capabilities for use in access to the information stored on the storage devices, such as storage devices 160. That is, the volume manager provides functions such as (i) aggregation of the storage devices, (ii) aggregation of storage bandwidth of the storage devices, and (iii) reliability guarantees, such as minoring and/or parity (RAID).

Bridging the protocol stack 122 and file system 128 is anti-virus filter 126, which is responsible for intercepting I/O requests (such as "read", "write", "open", "close", "rename", etc) from clients 110 and issuing requests to scan data for viruses (e.g., scan requests) to the anti-virus blade 140 based on a set of rules. The term "viruses" means undesired codes, programs, commands, or computer instructions, particularly those introduced into a computer system, network, program or data for malicious purposes. Viruses may (a) self-replicate or self-reproduce, (b) cause the loss or corruption of a program or data, (c) cause malfunction or interruption in operation of a computer system, network or other intelligent system, or (d) permit unauthorized access to a program, data, computer system, network or other intelligent system. A scan request operation may also find security vulnerabilities.

Anti-virus filter 126 intercepts I/O requests using a filter framework 133 described in detail in a commonly-owned U.S. patent application Ser. No. 11/789,073, entitled "System and Method for Filtering Information in a Data Storage System," by Paul Yuedong Mu, now issued as U.S. Pat. No. 7,809,868 on Oct. 5, 2010, the contents of which are hereby incorporated by reference herein. Briefly, anti-virus filter 126 registers I/O callback procedures with a filter framework 133 implemented at the storage system 120. A call to a filter invokes the filter, often with passed parameters, while a callback represents instructions passed to the filter for execution, often to call other procedures or functions. In an exemplary embodiment of the present invention, the filter framework 133 includes an I/O map (not shown) and an event map (not shown). Both the I/O map and the event map are stored in memory 325 (shown in FIG. 3) of storage system 120. The I/O map is a data structure that holds identifiers for filters (such as anti-virus filter 126) and I/O operations for which the filters are registered. Those of skill in the art would understand that any data structure can be used to hold identifiers and I/O operations, and that using a map is just one implementation of such a data structure. The identifiers are used to provide the registered callbacks for the registered filters. The event map is a data structure that holds identifiers for filters and filter characteristics, such as an indication of whether a filter is a remote filter.

When filter framework 133 intercepts an I/O received from clients 110, it determines which I/O callback needs to be invoked, and invokes the callbacks. According to an embodiment of the present invention, anti-virus filter 126 registers I/O callbacks with the filter framework 133 for I/O access requests coming from the protocol stack 122.

As will be described in more detail herein, anti-virus filter 126 is also responsible for obtaining data for scanning from file system 128 and providing the data to the anti-virus application 146 at the anti-virus blade 140. Once the results of the scanning procedure return, anti-virus filter 126 completes the client request based on the scan results. For example, anti-virus filter 126 may allow the request to be served based on the scan results or blocks the request (as will be described in more detail herein in the "Methods of Operation" section).

Still referring to FIG. 2, anti-virus blade 140 providing anti-virus services to storage system 140 according to an embodiment of the present invention is shown. Anti-virus blade 140 communicates with storage system 120 over a network 135, which can be a local area network. Anti-virus blade 140 executes anti-virus application 146, interceptor module 148, anti-virus engine 142, and virtual file filter 144 (other hardware and software components of the anti-virus blade 140 are described herein in reference to FIG. 4). Anti-virus blade 140 also executes a file framework module 149. Virtual file filter 144 and interceptor module 148 register their I/O callback procedures with the file framework module 149 so that the file framework module 149 calls registered filters when an I/O request is received. As described herein, a callback represents instructions passed to the filter for execution, often to call other procedures or functions. In an exemplary embodiment of the present invention, the filter framework 149 includes an I/O map (not shown) and an event map (not shown). Both the I/O map and the event map are stored in memory 430 (shown in FIG. 4) of anti-virus blade 140. The I/O map is a data structure that holds identifiers for filters (such as virtual file filter 144) and I/O operations for which the filters are registered. The identifiers are used to provide the registered callbacks for the registered filters. The event map is a data structure that holds identifiers for filters and filter characteristics, such as an indication of whether a filter is a remote filter. Those of skill in the art would understand that any data structure can be used to hold identifiers for filters and store registered callbacks. According to an embodiment of the present invention, the file framework module 149 identifies an I/O request, determines which I/O callback needs to be invoked, and invokes the callback.

Anti-virus application 146 is a commercially available product that can be provided by Trend Micro, Inc. of Cupertino, Calif., by Symantec Corporation of Cupertino, Calif., or any other manufacturer. Anti-virus application 146 may use both rule-based and pattern recognition technology to detect and remove viruses. As described herein, "viruses" can mean undesired codes, programs, commands, or computer instructions, particularly those introduced into a computer system, network, program or data for malicious purposes. The anti-virus application 146 scans data for a virus using various compression algorithms, such as PKZIP®, PKZIP_SFX, LHA, UNIX COMPACKED, UNIX LZW, as well as other algorithms.

Anti-virus engine 142 is responsible for receiving requests for scanning, creating a "dummy" file (or a stub file) (e.g., file that has the same name as the Currently Amended file indicated in the request, but does not contain data) and adding an entry to a directory of a local file system 152. Those skilled in the art would understand that other types of data structures than file system and directory can be used. The anti-virus engine 142 is also configured to issue a read command to the stub file. According to an embodiment of the present invention, interceptor module 148 of the anti-virus application 146 registers the I/O callback for the read request initiated by anti-virus engine 142. When anti-virus engine 142 issues a read request, file framework module 149 calls the interceptor module 148, which forwards the read to the anti-virus application 146. The anti-virus application 146 uses its rules (described in more detail herein) to determine whether to initiate a scan operation. Notably, anti-virus engine 142 can be implemented by a manufacturer of the storage system 120 and does not need to be implemented by the manufacturer of the anti-virus application 146.

Thus, the present invention leverages the ability of the anti-virus application 146 to intercept an I/O request using the file framework module 149 and to initiate a scan operation without receiving a scan request from a scan server or via any other proprietary interface. This novel approach is advantageous since it does not require anti-virus manufacturers to develop an interface that triggers scanning operations. This, in turn, allows users of client systems to be more flexible in choosing anti-virus manufacturers.

According to an embodiment of the present invention, virtual file filter 144 registers its I/O callbacks with the file framework module 149 to intercept read requests initiated by the anti-virus application 146. Callbacks and modules registered for the callbacks can be stored in a data structure, such as an I/O map. For example, when anti-virus application 146 issues a read request to the stub file, the file framework module 149 intercepts the read and determines (using I/O map and/or event map) which module has registered a callback for this read request, and invokes the callback from that module. Virtual file filter 144 is also responsible for issuing requests for data to be scanned to the anti-virus filter 126 executed at the storage system 126.

Methods of Operation

Figure 5:
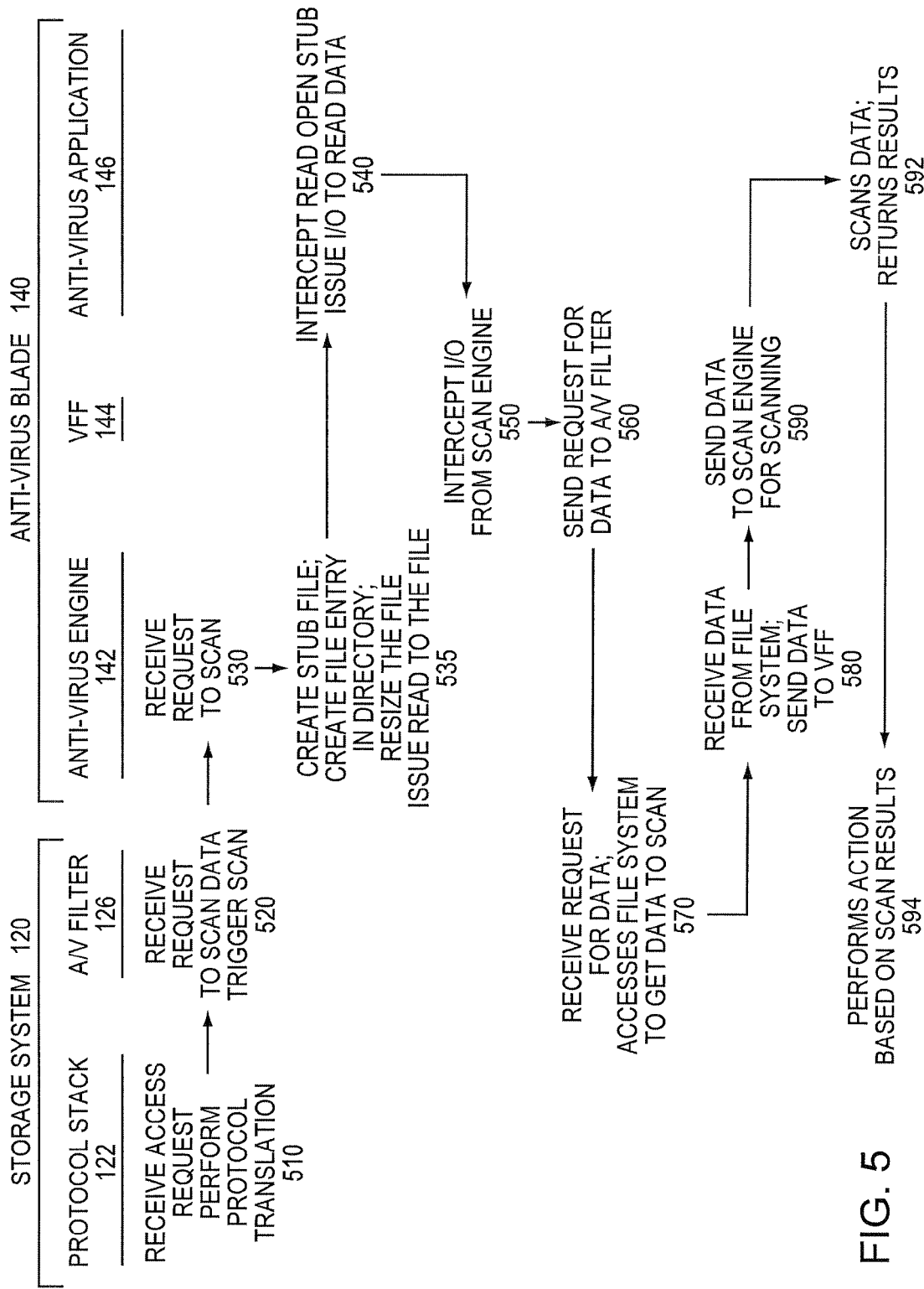
FIG. 5 is an event diagram of the steps performed by the anti-virus blade and storage system to provide anti-virus capabilities to storage system shown in FIG. 2.

Referring now to FIG. 5, it shows communications between various components of the storage system 120 and components of the anti-virus blade 140 to scan data stored at the storage system 120 according to an embodiment of the present invention.

Initially, storage system 120 receives a client access request. As previously described, requests can be transmitted in the form of data packets using, for example, the Common Internet File System (CIFS) protocol over Transmission Control Protocol/Internet Protocol (TCP/IP), NFS protocol over TCP/IP or DAFS protocol. The request can arrive using the SCSI or FC protocol. The request can be to read data maintained by the storage system 120, to write data, or to perform other operations. Protocol stack 122 (that includes, for example, CIFS server, NFS server, DAFS server, ISCSI layer, or FC layer) receives the data packet and performs protocol translation (step 510).

Filter framework module 133 intercepts the read request. As described herein, anti-virus filter 126 registers I/O callbacks with the filter framework 133 implemented at the storage system 120. According to an embodiment of the present invention, anti-virus filter 126 registers I/O callbacks with the filter framework module 133 for I/O access requests coming from the protocol stack 122. When an I/O request comes in, filter framework 133 intercepts the I/O and determines (using the I/O map and the event map described herein) which I/O callback needs to be invoked, and invokes the callback to call anti-virus filter 126. Anti-virus filter 126, in turn, issues a request to scan data using its rules (step 520). Anti-virus filter 126 maintains various rules for sending a request to scan data. These rules may be stored in memory 325. For example, a rule may indicate that a scan operation can be sent on a first read request to the file and a last write request to the file. When a predetermined amount of time passes since a most current write request is received and no other write request is issued, that write operation is called a "last write." The "time" parameter can be stored in a configuration file in a persistent storage (e.g., disks). When the file is loaded in memory 325, it becomes part of a data structure accessed by the anti-virus filter 126.

Anti-virus filter 126 sends a request for scanning to anti-virus blade 140. Anti-virus engine 142 at the anti-virus blade 140 receives the command (at step 530). The anti-virus engine 142 creates a stub file and adds an entry to a directory at the local file system 152 (at step 535). The created stub file has the same name and size as the Currently Amended file indicated in the scan request. Anti-virus engine 142 issues a read command to the stub file. The read command is intercepted by file framework module 149. File framework module 149 determines which module registered an I/O callback for that command. According to an embodiment of the present invention, interceptor module 148 of the anti-virus application 146 registers an I/O callback for I/O issued by the anti-virus engine 142. File framework module 149 calls the interceptor module 148, which in turn, forwards the read request to the anti-virus application 146 (at step 540).

Anti-virus application 146, in turn, maintains rules for scanning data. These rules are typically specified by a manufacturer. Thus, a rule may specify that all files need to be scanned if they were not previously scanned. Files that have been scanned are flagged to that effect. If the file need not be scanned, the read request is released, and it goes back to the anti-virus engine 142 successfully. In this case, anti-virus engine 142 closes the file.

If the file has not been previously scanned, anti-virus application 146 opens the file and issues a read command to the file, thereby triggering a scan operation (at step 540). Thus, by issuing a read command to the stub file, the anti-virus engine 142 leverages the ability of the anti-virus application 146 to intercept an I/O request and to initiate a scan operation. This novel approach can be contrasted with prior art implementations, which required a component, such as a scan server, to be developed to initiate a scan operation. The novel approach eliminates dependency of users of client systems from a limited number of anti-virus manufacturers who develop an interface that passes requests for scanning to an anti-virus application.

The file framework module 149 intercepts the read command issued by the anti-virus application 146 and identifies a module that has registered an I/O callback for this command. According to an embodiment of the present invention, virtual file filter 144 registers the I/O callback for this command. File framework module 149 invokes a callback from the virtual file filter 144 (step 550). Virtual file filter 144 issues an RPC for data to be scanned to the anti-virus filter 126 at the storage system (step 560). Those skilled in the art would understand that techniques other than sending an RPC can be used to send a request for data.

Anti-virus filter 126 at the storage system 120 receives the request for data and forwards the request for data to the file system 128 (step 570). The file system 128 either fetches the data from memory 325 or from storage devices 160. The file system 128 returns data to anti-virus filter 126.

Thus, rather than requiring the anti-virus application 146 to send a request for data to the protocol stack 122 at the storage system 120 and then to the file system, the request for data is sent to anti-virus filter 126, which directly accesses file system for data. Since a request no longer goes to the protocol stack, the request does not need to be translated to a protocol understood by the storage system 120. By circumventing the need to send the requests for data to the protocol stack, the present invention improves performance of the storage system as compared to prior art implementations.

Anti-virus filter 126 sends the data to virtual file filter 144 at the blade 140 (step 580). Virtual file filter 144 receives the data and sends the data to anti-virus application 146 for scanning (step 590). Anti-virus application 146 uses various algorithms to scan data (step 592). Thus, in one embodiment, anti-virus application 146 reads the first 4K block of the file, the last 4K block of the file and then 4K block before the last block. Those skilled in the art would understand that a block of any size can be read. For certain files, anti-virus application 146 also reads beyond the end of the file. As previously described, anti-virus application 146 can use various algorithms to scan data for virus. If the virus is found, anti-virus application 146 provides an indication that the file is infected. Virtual file filter 144 can intercept the results of the scanning operation if the virus is found and send the results to anti-virus filter 126 at the storage system 120.

Anti-virus filter 126 receives scan results. A scan result may indicate, for example, whether a particular file is infected or not. Anti-virus filter 126 performs an action based on the scan results (step 594) using its rules, which can be provided by a manufacturer. For example, a rule may indicate that if a file is infected, access to the file should not be allowed and a flag to indicate that the file is infected needs to be set. A rule may indicate that if a file is not infected, access to the file has to be provided.

Implementation in SAN Device

Although the present invention has been described in the context of the storage system 120 implemented as a NAS device, those skilled in the art would understand that the storage system can be implemented as a SAN device with several modifications, as described herein.

For example, when a storage system is implemented as a SAN device, data is presented to clients 110 as one or more logical units (LUs). A logical unit comprises data blocks configured to store information. As described herein, clients 110 send block-based requests to a volume using, for example, SCSI or FC protocols. According to this embodiment, sending a request to scan every block indicated in access requests may result in unnecessary operations. This, in turn, slows down performance of the storage system 120. Thus, according to this embodiment, anti-virus filter 126 at the storage system 120 may send requests for scanning less frequently (as compared to the NAS implementation). For example, anti-virus filter 126 may send requests for scanning according to a schedule as to avoid blocks to be scanned unnecessarily. Such a schedule may be stored in a configuration file in a persistent storage (e.g., disks). When a configuration file is loaded in memory, it becomes part of a data structure accessed by the anti-virus filter 126. In another embodiment, anti-virus filter 126 sends requests for scanning for certain block addresses. To this end, anti-virus filter 126 monitors write requests and stores them in memory 325. It also stores a list of modified data blocks since the last scan operation. When anti-virus filter 126 sends a request for scanning, the list becomes part of the request. As a result, a request for scanning is issued for the modified blocks. In yet another implementation, anti-virus filter 126 may request scanning operations based on the source of the originated client request. Thus, anti-virus filter 126 sends a request to anti-virus blade 140 to scan certain blocks.

When anti-virus blade 140 receives a request to scan data identified by a block address(es), it creates a stub file (step 535). According to this embodiment, the created stub file simulates a volume and has the same name and size as the volume or other level of virtualized storage, such as aggregates, datasets, etc. Anti-virus engine 142 issues a read command to the stub file to read blocks indicated in the request received from the anti-virus filter 126. Anti-virus application 146 intercepts the read command (using the above-described filter framework mechanism) and issues a read command to the stub file to read blocks indicated in the intercepted read command. Virtual file filter 144 on the anti-virus blade 140 intercepts the read request from the anti-virus application 146 (using the file framework module 149) and issues an RPC (or any other type of request) to the anti-virus filter 126 at the storage system to read blocks indicated in the Currently Amended scan request.

The anti-virus filter 126 receives the request and sends the request for data blocks to the volume manager 128 to obtain data for scanning. Thus, according to this embodiment, the requests for scanning data are sent to the anti-virus blade 140 according to a different policy than in the NAS implementation.

Storage System Architecture

Figure 3:
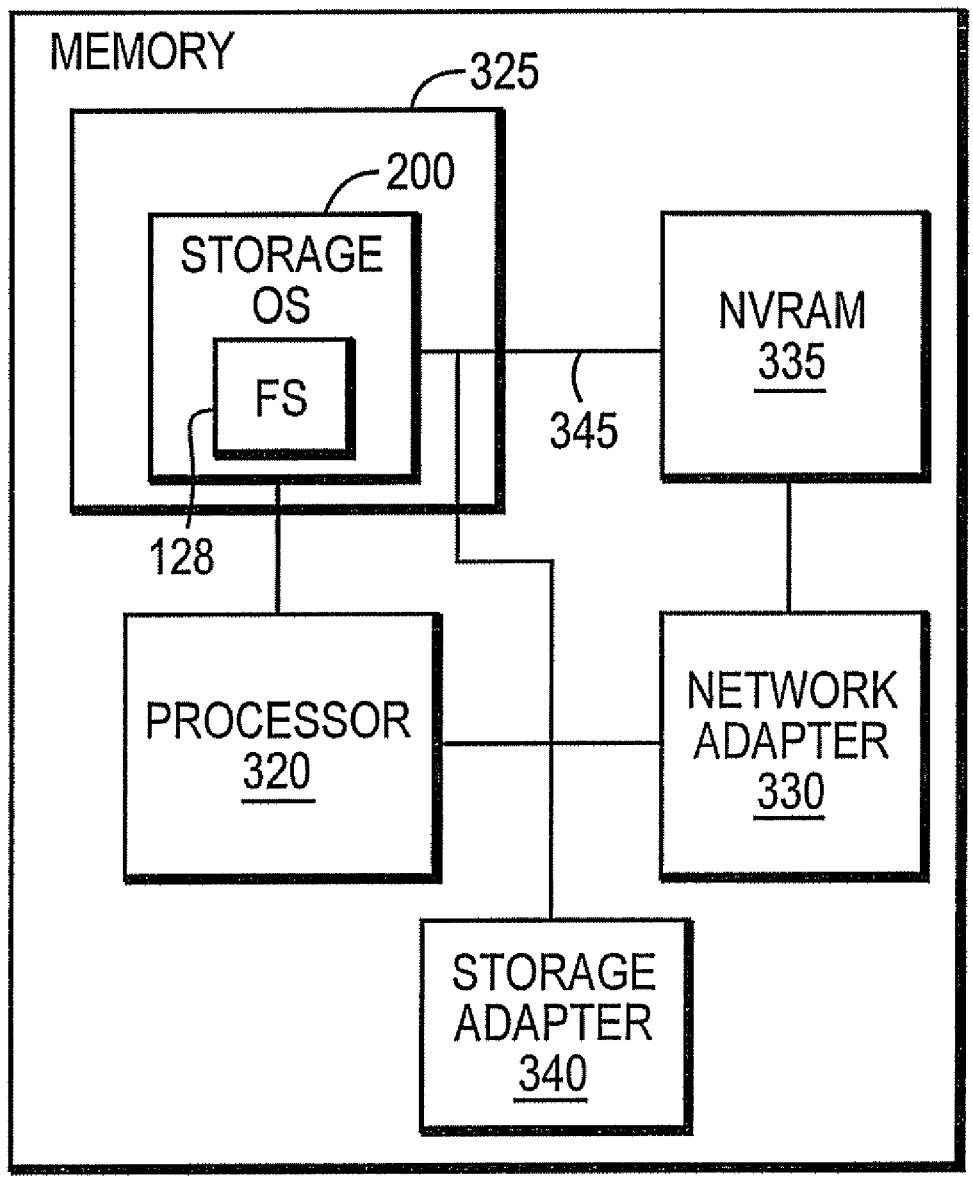
FIG. 3 is a block diagram of the components of the storage system shown in FIG. 2 according to an embodiment of the present invention.

FIG. 3 is a block diagram of the components of the storage system 120 shown in FIG. 2. Storage system 120 comprises a plurality of processors 320, a memory 325, a network adapter 330 and a storage adapter 340 interconnected by a system bus 345. Storage system 120 also includes storage operating system 200 (shown in more detail in FIG. 2). Storage system can implement a file system (such as file system 128) or a volume manager.

In the illustrative embodiment, the memory 325 comprises storage locations that are addressable by the processors and adapters for storing software program code. The memory 325 can be a random access memory (RAM). The processor 320 and adapters may, in turn, comprise processing elements and/or logic circuitry configured to execute the software code and manipulate the data structures stored in memory. The operating system 200 portions of which are typically resident in memory, functionally organizes the storage system by, inter alia, invoking storage operations on the storage system. It will be apparent to those skilled in the art that other processing and memory means, including various computer readable media, may be used for storing and executing program instructions pertaining to the inventive technique described herein.

The network adapter 330 comprises the mechanical, electrical and signaling circuitry needed to connect storage system 120 to the network 130, which may comprise a point-to-point connection or a shared medium, such as a local area network.

The storage adapter 340 cooperates with the operating system 200 executing on the storage system to access information requested by the clients (such as client 110 shown in FIG. 2). The information may be stored on the storage devices 160 that are attached, via the storage adapter 340 to storage system 120. Those skilled in the art would understand that information may be stored on other media.

In one exemplary implementation, storage system 120 can include a non-volatile random access memory (NVRAM) 335 that provides fault-tolerant backup of data, enabling the integrity of storage system transactions to survive a service interruption based upon a power failure, or other fault. The size of the NVRAM depends in part upon its implementation and function in the storage system. It is typically sized sufficiently to log a certain time-based chunk of transactions.

Anti-Virus Blade Architecture

Figure 4:
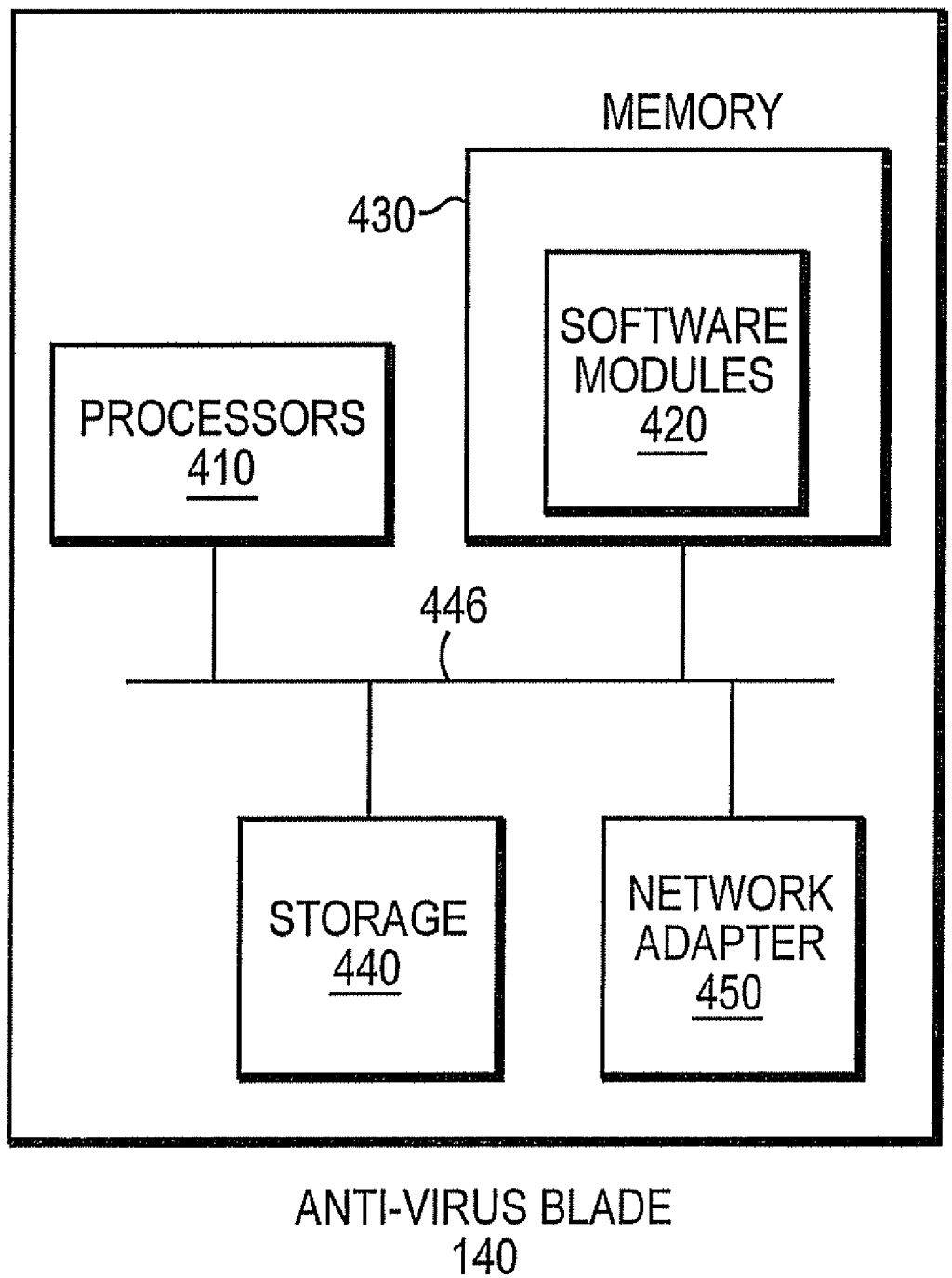
FIG. 4 is a block diagram of components at the anti-virus blade providing anti-virus capabilities to the storage system shown in FIG. 2.

Referring now to FIG. 4, other components of anti-virus blade 140 are shown in more detail. Anti-virus blade 140 is a computer system that comprises a processor 410, a memory 430, a network adapter 450, and a local storage 440 coupled by a bus 446.

The processor 410 is the central processing units (CPUs) of the anti-virus blade 140, and thus controls the overall operation of the anti-virus blade 140. In certain embodiments, the processor 410 accomplishes this by executing software such as that described in more detail with reference to FIG. 2.

Memory 430 comprises storage locations that are addressable by the processor 410 and a network adapter 450 for storing software program code, such as software modules 420 and data structures associated with the present invention. The processor 410 may, in turn, comprise processing elements and/or logic circuitry configured to execute software modules 420 (such as anti-virus engine 142, virtual file filter 144, file system 152, anti-virus application 146, and file framework module 149). These components were described in more detail with reference to FIG. 2.

Memory 430 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The network adapter 450 comprises a plurality of ports adapted to couple the anti-virus blade 140 to storage system 120 over point-to-point links, wide area networks (such as network 135), virtual private networks implemented over a public network (Internet) or a shared local area network. The network adapter 450 thus may comprise the mechanical, electrical and signaling circuitry needed to connect the node to the network.

Local storage 440 is a device that stores information within anti-virus blade 140, such as software modules 420, operating system (not shown), and data. Anti-virus blade 140 loads software modules 420 into memory 430 from which they are accessed by processor 410.

Thus, embodiments of the present invention provide an anti-virus blade that can host any third-party anti-virus application with high-performance access to a storage system. Advantageously, the present invention eliminates the need to require manufacturers of anti-virus applications to develop an interface (such as a scan server) that triggers scanning operations.

Although the present invention for purpose of explanation has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims. For example, according to another embodiment, instead of having an anti-virus engine to issue a read command to the stub file, anti-virus engine 142 invokes an Application Programming Interface (API) directly to anti-virus application 146 to scan the data based on the name of the stub file.

According to yet another embodiment, if the created stub file is a CIFS file or NFS file, anti-virus application 146 can obtain data from the storage system by sending a request to the protocol stack. Although this embodiment requires accesses to a protocol stack, still it eliminates the need to implement an interface, such as a scan server, that initiates scan operations.

Furthermore, according to other embodiments of the present invention, the anti-virus blade 140 can provide off-node computing services, such as encryption and decryption. In such an implementation, client 110, for example, issues a write request to storage system 120. Anti-virus filter 126 intercepts a write request and sends an encryption request to anti-virus blade 140 to encrypt data indicated in the write request. Anti-virus blade 140 encrypts the data and sends the data back to the anti-virus filter 126 at storage system 120. The anti-virus filter 126, in turn, forwards the encrypted data to the file system 128. Similarly, anti-virus filter 126 intercepts a read request and sends a request to anti-virus blade 140 to decrypt data. Anti-virus blade 140 decrypts data and sends the decrypted data back to anti-virus filter 126, which, in turn, provides decrypted data to clients 110.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g., electronic) constructions and each coupled to a computer system bus. Each of these media may be coupled to a computer system bus through use of an appropriate device for reading and or for writing the media.

Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g., electronic) quantities within the computer systems registers and memories into other data similarly represented as physical quantities within the computer system.

What is claimed is:

1. A system for providing anti-virus services to a storage system, comprising:
    an electronic processor of an anti-virus computer configured to execute an anti-virus engine, the anti-virus engine configured to receive a first request over a network from the storage system to scan a container maintained at the storage system, the anti-virus engine further configured to create a stub container associated with the container in response to receiving the first request and further configured to issue a second request with the stub container for the storage system to fetch the container, wherein the second request circumvents a protocol stack of at least one of the storage system and the anti-virus computer; and
    a virtual file filter configured to execute at the storage system and configured to receive the second request, and in response to receiving the second request, provide the container to the anti-virus computer for scanning.

2. The system of claim 1 further comprising an anti-virus application of the anti-virus computer configured to register with a file framework module executed at the anti-virus computer to receive I/O requests issued by the anti-virus engine.

3. The system of claim 1 further comprising a file framework module executed at the anti-virus computer configured to register with the virtual file filter to receive I/O requests issued by the anti-virus application.

4. The system of claim 1 wherein the stub container represents a volume maintained by the storage system.

5. The system of claim 1 further comprising an anti-virus application at the anti-virus computer and configured to issue the second request to one or more blocks of the container.

6. The system of claim 1 further comprising an anti-virus application at the anti-virus computer and configured to scan the container and further configured to return a result of the scanned data to the storage system.

7. The system of claim 1 wherein the anti-virus engine is further configured to trigger a data scanning operation of the container to be performed by an anti-virus application at the anti-virus computer.

8. The system of claim 1 wherein the anti-virus engine is further configured to store the stub container at a local file system of the anti-virus computer.

9. The system of claim 1 wherein the stub container comprises a name of the container.

10. The system of claim 1 further comprising an anti-virus application of the anti-virus computer, the anti-virus application configured to initiate a scan operation of the container without receiving a request from the storage system to initiate the scan operation.

11. The system of claim 1 further comprising an anti-virus filter for execution at the storage system and configured to:
    register with a file framework module at the anti-virus computer to receive the second request;
    issue a scan request to the anti-virus engine to scan the container;
    receive scan results provided by the anti-virus application; and
    control access to the container at the storage system in response to receiving the scan results.

12. The system of claim 11 wherein the anti-virus filter is further configured to issue the scan request.

13. A computer-implemented method for providing anti-virus services, comprising:
    receiving over a network at an anti-virus computer a first request from a storage system for the anti-virus computer to scan a data container maintained at the storage system;
    in response to receiving the first request, creating by the anti-virus computer a stub data container associated with the data container;
    issuing, with the stub data container, a second request sent from the anti-virus computer for the storage system to fetch the data container associated with the stub data container, the second request circumventing a protocol stack of the storage system; and
    in response to receiving the second request, providing the data container to the anti-virus computer for scanning.

14. The method of claim 13 further comprising circumventing a protocol stack of the anti-virus computer to send the stub data container.

15. The method of claim 13 wherein the second request to scan data comprises a file identification of the data container.

16. The method of claim 13 wherein the second request to scan data comprises an address of modified blocks of the data container.

17. The method of claim 13 further comprising encrypting the data container at the anti-virus computer.

18. The method of claim 13 further comprising triggering a scan operation at the anti-virus module without receiving a scan request from the storage system.

19. A computer-implemented method for providing anti-virus services to a storage system, comprising:
    receiving, by an anti-virus engine executed by an electronic processor at an anti-virus blade, a first request from the storage system received over a network to scan data maintained at the storage system;
    in response to receiving the first request, creating, by the anti-virus engine, a stub file associated with the data and sending by the anti-virus blade a second request with the stub file for the storage system to fetch the data associated with the stub file, wherein sending the second request comprises circumventing a protocol stack of the anti-virus blade; and receiving, by a virtual file filter executing at the storage system, the second request and in response to receiving the second request, providing the data associated with the stub file to the anti-virus blade, wherein providing the data comprises circumventing a protocol stack of the storage system.

20. The method of claim 19 further comprising initiating a scan of the data at the anti-virus blade, wherein the scan is initiated without receiving a request to initiate the scan by the storage system.

21. The method of claim 19 wherein the second request to scan data comprises a volume identification and a file identification associated with the data.

22. The method of claim 19 wherein the second request to scan data comprises an address of modified blocks of the data.

23. The method of claim 19 further comprising registering with a file framework module of the anti-virus blade by an interceptor module of the anti-virus application to receive an I/O command issued by the anti-virus engine.

24. The method of claim 19 further comprising registering with a file framework module of the anti-virus blade by the virtual file filter to receive an I/O command issued by the anti-virus application.

25. A computer-readable storage apparatus configured with executable program instructions for execution by a processor, the computer-readable storage medium comprising:

program instructions that receive over a network at an anti-virus computer a first request from a storage system to scan data maintained at the storage system;

program instructions that, in response to receiving the first request, create at the anti-virus computer a stub data container associated with the data;

program instructions that issue a second request with the stub data container from the anti-virus computer to the storage system to fetch the data associated with the stub data container for the anti-virus computer; and program instructions that scan at the anti-virus computer, the fetched data.

* * * * *